Dec. 22, 1959   R. A. HAWLEY   2,917,888
FOOD MOLD LOADER
Filed July 5, 1957   2 Sheets-Sheet 1
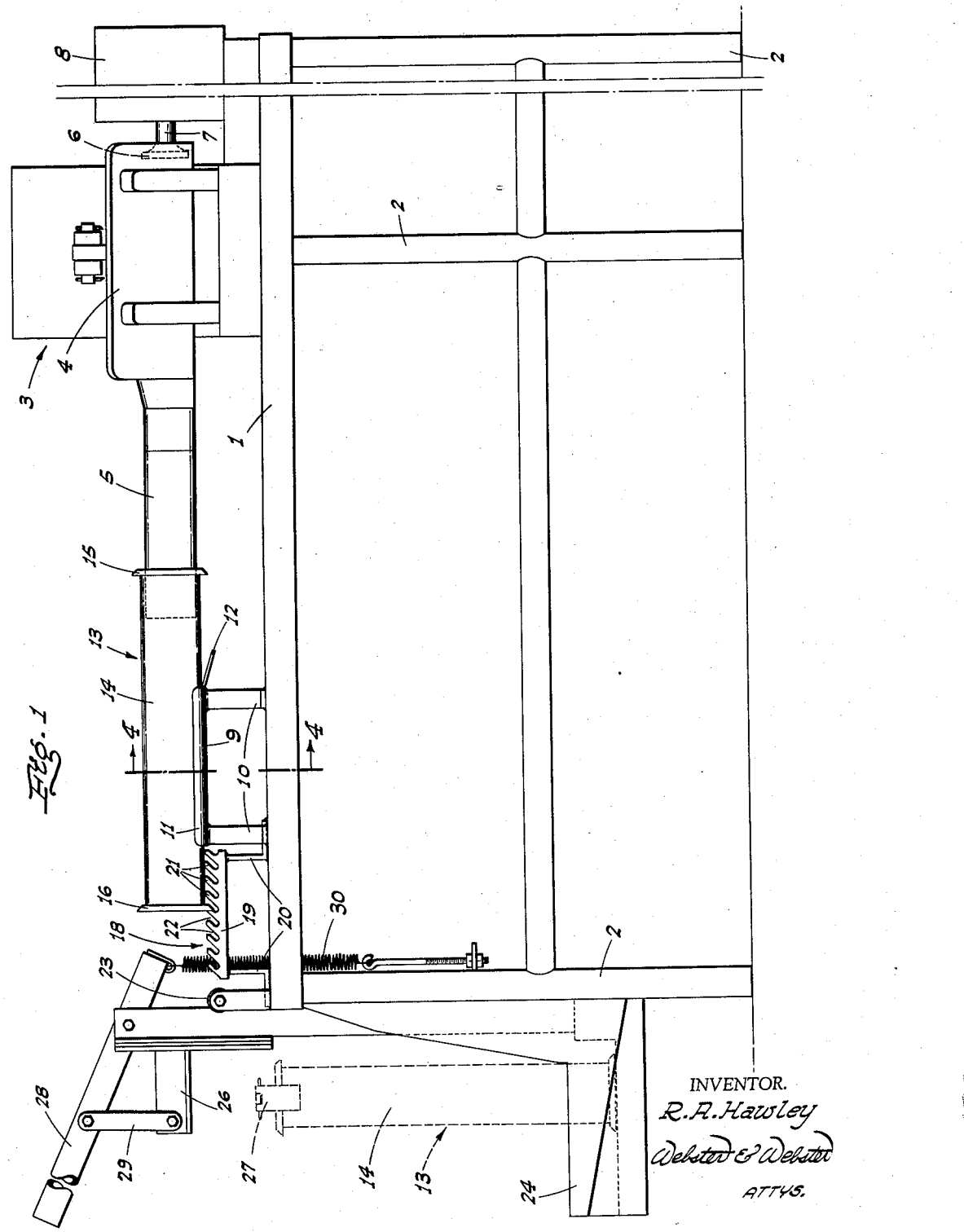
INVENTOR.
R. A. Hawley
Webster & Webster
ATTYS.

Dec. 22, 1959    R. A. HAWLEY    2,917,888
FOOD MOLD LOADER
Filed July 5, 1957    2 Sheets-Sheet 2
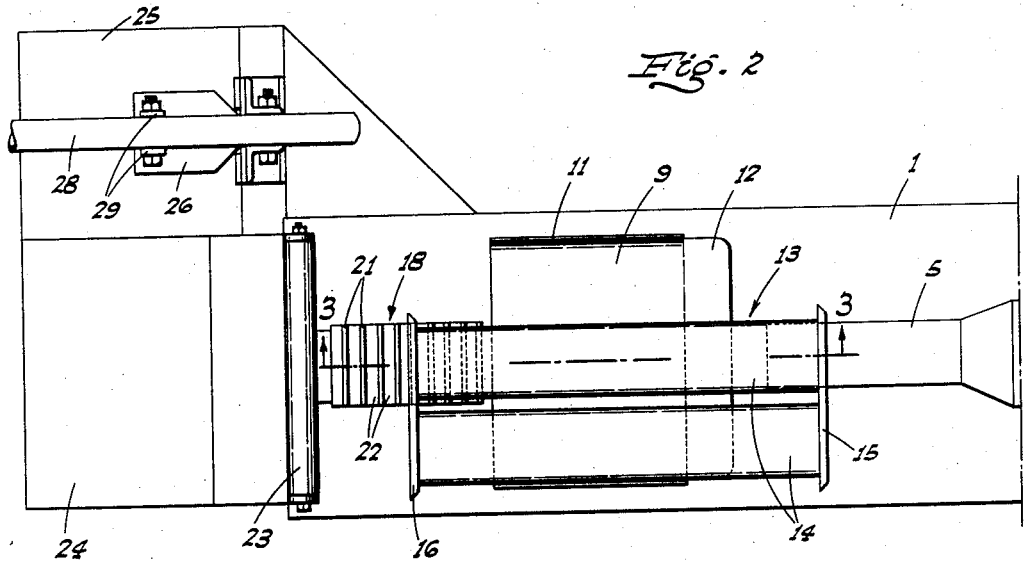
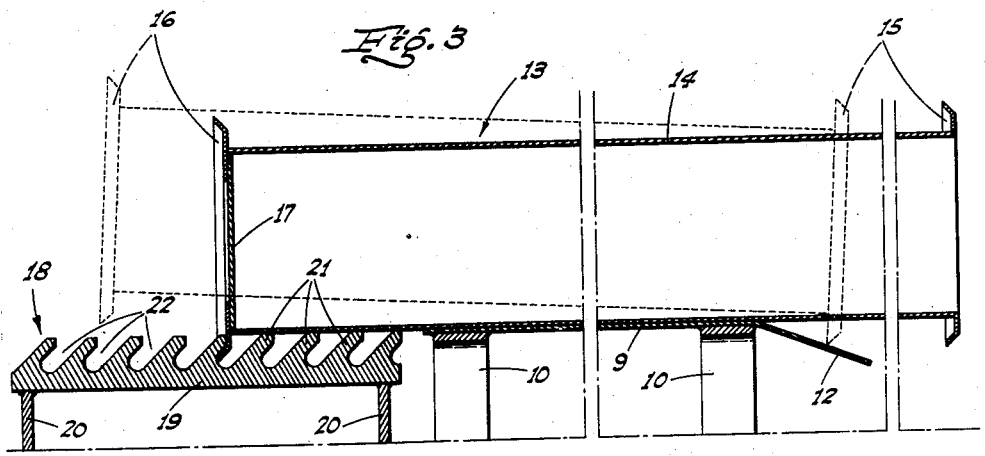
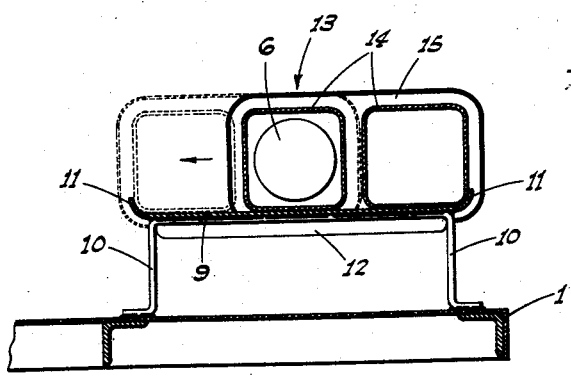
INVENTOR.
R. A. Hawley
BY Webster & Webster
ATTYS.

United States Patent Office 2,917,888
Patented Dec. 22, 1959

2,917,888

FOOD MOLD LOADER

Richard A. Hawley, Oakland, Calif., assignor to Meat Packers Equipment Co., Oakland, Calif., a corporation of California Application July 5, 1957, Serial No. 670,312

5 Claims. (Cl. 53—392)

This invention relates in general to improvements in a food mold loader, and particularly for ham. Such apparatus is of the type wherein a boneless ham is press-formed in a chamber and then forced by a fluid pressure actuated plunger out of the chamber, through a stuffing horn, and thence into a ham mold supported in communication with such horn.

The present invention is directed in particular to—and it is a major object to provide—a novel supporting and stop unit for the mold, and wherein the latter can be positively and effectively — but quick-releasably — pre-located relative to the stuffing horn which projects thereinto.

Another important object of this invention is to provide a mold supporting and stop unit, as above, which embodies—adjacent a mold support—a stop comprised of a plurality of upstanding, transversely extending stop teeth arranged in row order and which upstand in a position to receive—selectively—the depending base flange of a horizontally supported mold whose opposite end receives the stuffing horn.

An additional object of this invention is to provide a mold supporting and stop unit, as in the preceding paragraph, wherein the support is adapted to accommodate a dual mold, with either of the side by side mold tubes in communication with the stuffing horn; the stop being effective regardless of which mold tube is in communication with the horn.

A further object of the invention is to provide a mold supporting and stop unit, of the type described, in novel combination with a roller and platform assembly which permits the mold—when loaded and released—to be readily shifted to an upstanding position preparatory to placement of the cover on said mold.

It is also an object of the invention to provide—in a food mold loader—a mold supporting and stop unit which is designed for ease and economy of manufacture, and simplicity of use.

Still another object of the invention is to provide—in a food mold loader—a mold supporting and stop unit which is practical, reliable, and durable.

These objects are accomplished by means of such structure and relative arrangement of parts as will fully appear by a perusal of the following specification and claims.

In the drawings:

Fig. 1 is a side elevation of a food mold loader embodying the present invention.

Fig. 2 is an enlarged fragmentary plan view showing particularly the mold supporting and stop unit, together with the roller and platform assembly.

Fig. 3 is an enlarged fragmentary sectional elevation, foreshortened, taken on line 3—3 of Fig. 2.

Fig. 4 is an enlarged fragmentary transverse sectional elevation taken on line 4—4 of Fig. 1.

Referring now more particularly to the drawings and to the characters of reference marked thereon, the present invention is embodied in a food mold loader which includes a work table 1 having legs 2; such table having a ham forming and stuffing machine mounted thereon, and which machine is indicated generally at 3.

The machine 3, which forms no part of the present invention, is of a type which includes a press chamber 4 in which a boneless ham is formed to a predetermined cross section, and thereafter the formed ham is forced from the press chamber 4 through a longitudinally projecting, horizontal stuffing horn 5 disposed adjacent but above the top of the work table 1. The formed ham is so advanced from the press chamber 4, and through the stuffing horn 5, by a plunger 6 on the free end of a piston rod 7 of a fluid pressure actuated power cylinder, the housing of which is indicated at 8.

The stuffing horn 5 occupies a position above the work table 1 some distance short of the forward end of the latter, and the following novel mold-supporting and stop unit is mounted on such table between said forward end of the latter and said stuffing horn:

Adjacent but ahead of the free or discharge end of the stuffing horn 5 there is a horizontal, flat supporting plate 9 maintained in fixed position by legs 10 which upstand from the table 1; such plate including—at its lateral edges—upturned lips or flanges 11.

The plate 9—which is of substantial width, for the purpose as will hereinafter appear—includes, at the edge adjacent the stuffing horn 5, a rearwardly and downwardly inclined apron 12.

The plate 9 is adapted to support, intermediate the ends thereof, a dual mold, indicated generally at 13, and which mold includes side by side mold tubes 14 which are generally rectangular in cross section, and which tubes are connected together at the ends by suitable means, but which means includes laterally outwardly projecting flanges; the top flange being indicated at 15, and the base flange at 16. Each mold tube 14 is closed at the base by an insert plate 17.

With the dual mold 13 resting on the supporting plate 9, but clear of the stuffing horn 5, such mold can be shifted laterally to register said horn with either of the mold tubes 15; the upstanding flanges 11 serving as stop elements to facilitate such registry.

With one mold tube 14 or the other in register with the stuffing horn 5, the mold 13 is shifted lengthwise until the horn enters the related tube a certain distance, and which is predetermined by a mold stop located beyond the supporting plate 9, and which mold stop is indicated generally at 18.

The mold stop 18 extends longitudinally forwardly from adjacent the supporting plate 9, and comprises a base 19 carried on legs 20 upstanding from the table 1.

Integral with the base 19 are a multiplicity of transversely extending, upstanding stop teeth 21 in longitudinal row order, and which teeth incline upwardly and rearwardly, defining therebetween upwardly opening transverse notches 22.

When the mold 13 is supported intermediate its ends by the plate 9, the depending portion of the base flange 16 can be selectively inserted in any one of the notches 22 and forwardly engaged with the corresponding stop tooth 21. In this manner the mold 13 can be held against longitudinal displacement in a direction away from the stuffing horn 5, and with such mold in a predetermined longitudinal position with respect to said horn. At the same time, the mold can be instantly released when desired. Such predetermined longitudinal positioning of the mold 13 is desirable in order to locate it for the proper reception in firm packed relation of a ham of given size in said mold. In other words, the mold 13 must be set at a selected longitudinal position which takes into consideration the stroke of the plunger 6 and the size or length of the ham which is to be loaded into the mold.

The stuffing horn 5, supporting plate 9, and stop 18 occupy horizontal planes such that when the mold 13 rests horizontally on said plate 9, the stuffing horn 5 projects easily into the registering mold tube 14, while the depending portion of the base flange 16 effectively engages one of the stop teeth 21.

After the mold 13 is loaded, an operator—standing alongside the work table 1—grasps the mold adjacent the stop 18 and imparts sufficient lift to clear the flange 16 from the engaged stop tooth 21, and thereafter the mold is shifted longitudinally forwardly on the supporting plate 9. With such movement the depending portion of the top flange 15 engages and rides up the inclined apron 12 so as to not cause any obstruction.

With continued forward movement of the loaded mold 13 it rides over—and is turned downwardly about—a horizontal, transversely extending roller 23 mounted on the forward end of the work table 1. As the mold 13 is so turned downwardly it comes to rest in a vertical or upstanding position on a low level, mold receiving platform 24 which projects outwardly from the forward end of the table 1.

Nextly, the upstanding mold 13 is shifted from the platform 24 onto a still lower and laterally offset platform 25; the mold then being disposed below a normally raised, downwardly movable press 26 operative to apply a spring catch type cover 27 to said mold.

The mold, as supported on the platform 25, is shown in dotted lines in Fig. 1. The press 26 is actuated by a hand lever 28, link-connected as at 29, and is returned to a starting position by a pull-back spring 30.

In a food mold loader, including the described mold supporting and stop unit, a food mold—such as for ham—can be rapidly and positively filled; being adjustable in its longitudinal position to assure that voids do not exist in the food as loaded into such mold, and that proper compaction is attained.

From the foregoing description it will be readily seen that there has been produced such a device as will substantially fulfill the objects of the invention, as set forth herein.

While this specification sets forth herein the present and preferred construction of the device, still in practice such deviations from such details may be resorted to as do not form a departure from the spirit of the invention, as defined by the appended claims.

Having thus described the invention, the following is claimed as new and useful, and upon which Letters Patent are desired:

1. A food-mold loader comprising a work table, a horizontal stuffing horn fixed adjacent and in vertical clearance relation to the table, a dual mold comprising transversely alined tubes open at one end and each adapted at said end to receive the horn therein in feeding relation, means releasably and adjustably holding the mold against longitudinal movement in a direction away from the horn, and means supporting the mold from the table for lateral shifting movement relative to the table and horn to place either tube in register with the horn.

2. A loader, as in claim 1, in which said releasable mold holding means comprises, with a depending cross flange on the end of the mold opposite the open end thereof, a base member mounted on the table back of the mold supporting means and in line with the stuffing horn; said member having a longitudinal row of transversely extending notches to receive said cross flange.

3. A food-mold loader comprising a work table, a horizontal stuffing horn fixed adjacent and in vertical clearance relation to the table, a mold open at one end adapted to receive the horn therein at said one end in feeding relation, means on the table supporting the mold in longitudinal alinement with the horn, a depending flange on the mold on the other end thereof, and a member on the table having a longitudinal row of transverse notches in its upper surface to releasably receive said flange to adjustably maintain the mold against longitudinal movement in a direction away from the horn.

4. In a food-mold loader which includes a table, a mold removably supported on the table in a horizontal position for loading, a platform below one end of the table to receive the mold in an upended position after being loaded and withdrawn lengthwise from the table, and a mold-lid press mounted in connection with the platform in laterally offset relation to the table-supported position of the mold.

5. A food-mold loader comprising a work table, a horizontal stuffing horn fixed adjacent and in vertical clearance relation to the table, a dual mold comprising transversely alined tubes open at one end and each adapted at said end to receive the horn therein in feeding relation, means releasably and adjustably holding the mold against longitudinal movement in a direction away from the horn, a supporting plate under the mold laterally centralized relative to the horn and sufficiently wider than the mold to enable the mold to be shifted laterally to place either tube in register with the horn, and upstanding lips on the sides of the plate to limit the lateral movement of the mold and locate the same relative to the horn.

References Cited in the file of this patent

UNITED STATES PATENTS

| | | |
|---|---|---|
| 134,592 | Dederick | Jan. 7, 1873 |
| 312,968 | Carey | Feb. 24, 1885 |
| 943,841 | Ohnstrand | Dec. 21, 1909 |
| 2,113,081 | Doering | Apr. 5, 1938 |
| 2,326,087 | Willard | Aug. 3, 1943 |
| 2,635,799 | Hoy | Apr. 21, 1953 |
| 2,726,024 | Hawley | Dec. 6, 1955 |